INVENTORS
HARRY R. BOWMAN
STANLEY G. THOMPSON
EARL K. HYDE
RICHARD C. JARED

ATTORNEY

United States Patent Office 3,433,954
Patented Mar. 18, 1969

3,433,954
SEMICONDUCTOR X-RAY EMISSION SPECTROMETER
Harry R. Bowman, Walnut Creek, and Stanley G. Thompson and Earl K. Hyde, Berkeley, and Richard C. Jared, Hayward, Calif., assignors to the United States of America as represented by the Administrator of the United States Atomic Energy Commission
Filed Sept. 16, 1966, Ser. No. 580,571
U.S. Cl. 250—83.3        11 Claims
Int. Cl. G01t 1/16

ABSTRACT OF THE DISCLOSURE

A new type of X-ray emission spectrometer incorporating high resolution semiconductor X-ray counters and specialized preamplifier circuitry in the detector system to provide a compact and economical instrument for rapid, non-destructive chemical analysis of materials.

---

Figure 1:
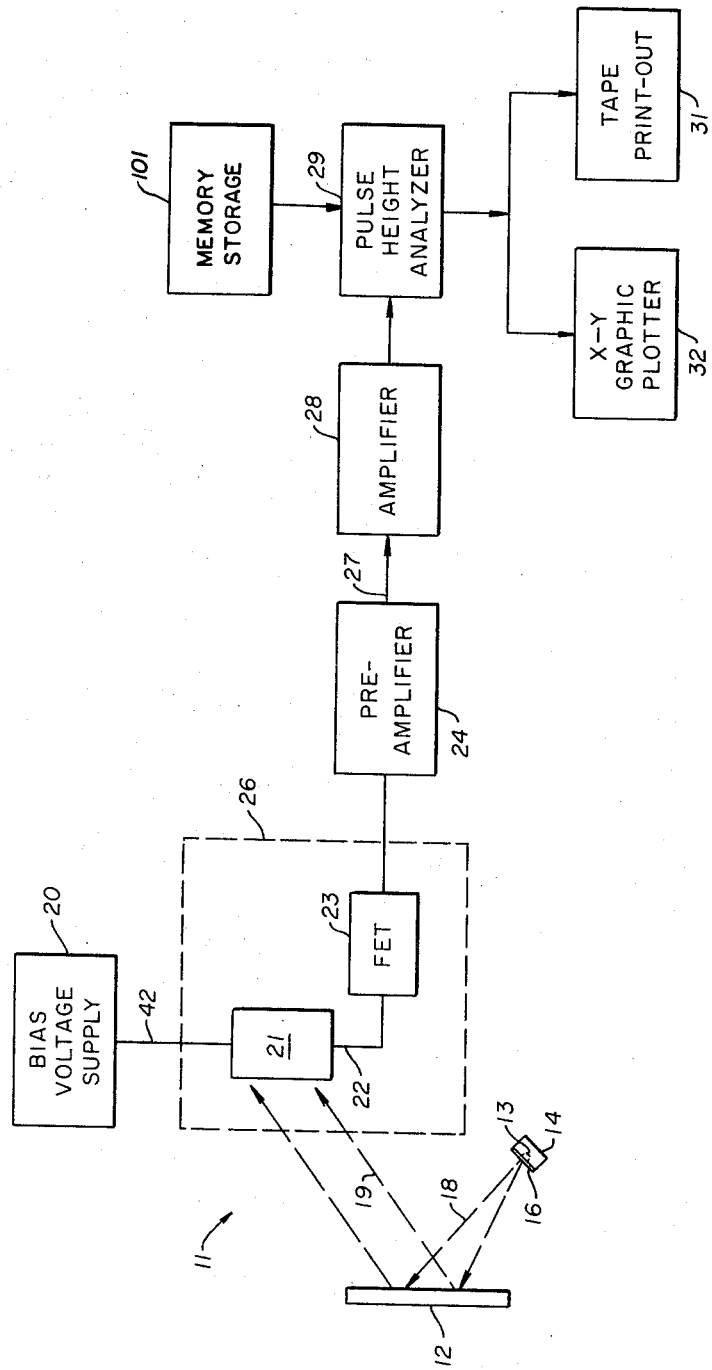

The present invention relates to improved means for the chemical analysis of materials and more particularly to a radically new type of X-ray emission spectrometer. The apparatus incorporates high resolution semiconductor X-ray counters and specialized preamplifier circuitry in the detector system to provide a compact and economical instrument for rapid, non-destructive chemical analysis of materials. The development of the subject invention was done in the course of, or under, Contract W–7405–eng–48 with the United States Atomic Energy Commission.

X-ray spectrometry is based on the physical phenomenon of X-ray fluorescence wherein the bombardment of matter with gamma ray or X-ray radiation produces an emission of secondary X-radiation from the material. The incoming radiation ejects electrons from the innermost shells of the atoms. The subsequent rearrangement of electrons results in the emission of X-rays from the atom, the wavelengths of which are uniquely characteristic of the particular atomic element. Thus the energies of the secondary X-ray emissions serve as identifying labels for the various atomic elements and an analysis of these X-rays reveals the atomic make-up of unknown substances so irradiated.

Accordingly, X-ray spectrometry for such chemical analysis essentially requires a source of the high energy primary radiation to impinge the surface of the sample substance to be analyzed; a means for detecting the secondary radiations emitted from the substance; and a technique for analyzing the spectral components of the secondary radiation to identify the characteristic wavelengths.

Proportional counters have been used in the past as a detector of the secondary radiation. The resolution, i.e., the ability to distinguish X-rays of closely similar energy, of these gas-type counters, however, leaves much to be desired. In the 15 kev. to 100 kev. X-ray energy range, the line width in the spectral information from the proportional counters steadily increases up to 7 kev. or higher. The efficiency also drops off rapidly over this energy interval. In contrast to this, the energy resolution of the semiconductor detectors of the subject invention are roughly constant at about 1 kev., and the counting efficiencies thereof remain greater than 50% over the entire range of 4 kev. to 100 kev.—the exact efficiency values depending upon the thickness of the detector depletion layer. Furthermore, the semiconductor detectors do not have the escape peak effects which have inherently complicated the secondary X-radiation energy spectra obtained from conventional proportional counters. Thus, the usefulness of the proportional counter in X-ray analysis is limited to very special cases and has forced the spectroscopist to use the more complicated X-ray diffraction goniometer system for general X-ray emission spectrography.

In the X-ray diffraction systems, the characteristic radiation is analyzed by Bragg angle scattering wherein the secondary radiation from the substance is collimated and scattered from a crystal surface. Upon proper selection of the Bragg angles of reflection, the number of photons scattered at each Bragg angle in a given period of time is registered in a Geiger counter whereby the secondary radiation is analyzed into its component wavelengths. A goniometer with suitably reliable automatic drive for measuring the crystal rotation is required for the results to accurately relate the counting rate with the scattering angles.

Due to the high resolution inherent in Bragg angle scattering, the diffraction type spectrometer is capable of very high resolving power. In order to achieve the good resolution, however, it is necessary that the goniometer be very precisely machined for accurate measurement of small angles whereupon the goniometer becomes an expensive component of the apparatus. Also, since the detection must be performed in a single-channel scan over the scattering angle range of interest, the spectral analysis of complex compounds becomes a rather time-consuming operation. Even though the Bragg spectrometer has essentially changed very little since its historic inception early in the century, it is a valuable and accurate instrument. However, it can be seen from the above, that the versatility and convenience of the device is quite limited by its size, complexity and expense.

The moderate measuring efficiencies of these conventional spectroscopic techniques, caused by intrinsic geometry factors and the above-described efficiency factors, have required the use of high intensity X-ray tubes as the primary radiation source. The X-ray tube sources are of disproportionately high intensity for the secondary radiation produced, and such high intensities invariably present power supply problems to the installation. The X-ray tube sources also have limited versatility, as the target material must be chosen to provide photons of the range of energies needed for the analysis of a given group of elements. Thus, several interchangeable source tubes are often required for the instrument.

The development of solid-state devices has provided the first opportunity for real innovation in nuclear spectroscopy. In particular, the development of high resolution semiconductor diodes which are used for radiation detection have made this technique of X-ray analysis practical for the first time. Comparable refinements in the electronic output circuitry which is used with such diodes have combined therewith to offer radical departures from the conventional techniques of nuclear radiation detection and energy measurement.

The present invention provides an X-ray emission spectrograph using either silicon or germanium semiconductor diodes as the secondary radiation detector. When suitably cooled, the diodes can absorb electromagnetic radiation at almost 100% efficiency. By using highly sensitive preamplifier circuitry at the diode output one can obtain pulses directly proportional to the energy of the individual photons. Also, owing to the small size of the primary radiation source and the detector, it is possible to achieve a close geometrical relationship of the primary radiation source, specimen, and secondary radiation detector. Consequently the device requires a primary radiation source of only moderate strength and, in fact, uses very small amounts of selected radioisotopes. The semiconductor detector is compatible with multi-channel pulse analyzers, thus all wavelengths of the characteristic radiation are measured simultaneously and can be immediately available as a record of the energy spectrum. Consequently, the subject spectrometer is a very compact, portable, and economical instrument as well as being very simple and fast to operate.

Accordingly, it is an object of the invention to provide an improved means for the detection and measurement of X-radiation.

It is another object of the invention to provide a means for rapid and non-destructive chemical analysis of materials.

It is a further object of the invention to provide an immediate and direct graphic analysis of the intensity and wavelength of fluorescent X-ray emission.

It is another object of the invention to provide an X-ray emission spectrograph which has good resolution over the spectrum of both L and K X-rays.

A still further object of the invention is to provide an X-ray emission spectrograph having a very high measuring efficiency.

A further object of the invention is to provide an X-ray spectrograph which is inexpensive to construct and simple to operate.

Another object of the invention is to provide an X-ray emission spectrograph which is compact and portable.

Figure 2:
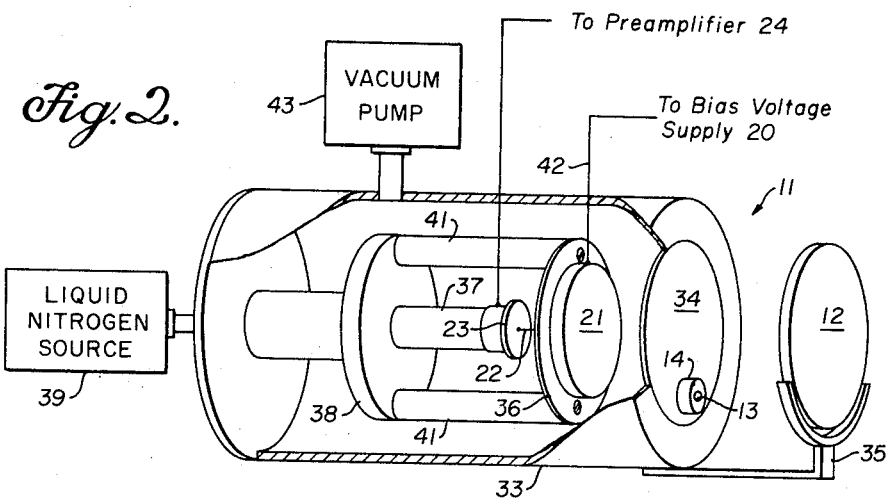
Figure 3:
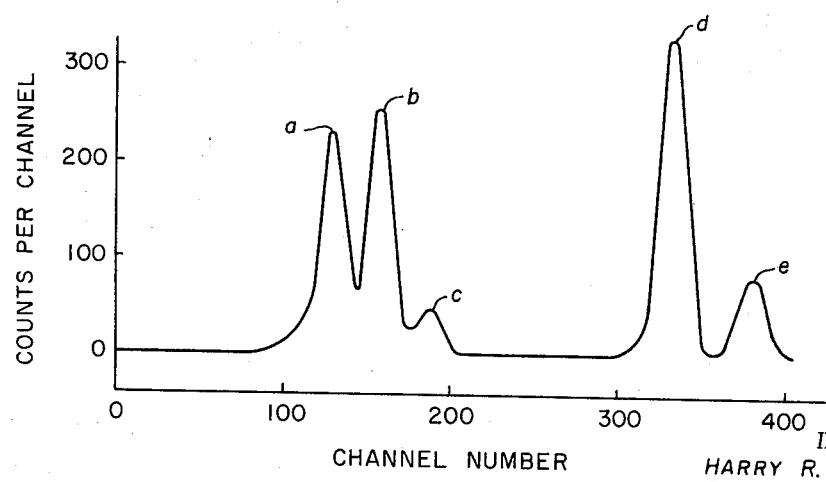

The invention, both as to its organization and method of operation, together with further objects and advantages thereof, will be best understood with reference to the following specification taken in conjunction with the accompanying drawing of which:

FIGURE 1 is a diagrammatic view of the invention showing the circuitry in block form, FIGURE 2 is a broken-out perspective view of one embodiment of the detecting apparatus of the invention, and FIGURE 3 is a plot of a spectral analysis produced by the invention.

Referring now to the drawing and more particularly to FIGURE 1 thereof, there is shown schematically the detecting head 11 of the invention. The sample specimen 12 to be analyzed is placed to receive gamma rays and X-rays from the primary radiation source 13. The radioactive source 13 material, such as americium-241 or cobalt-57, is prepared by depositing a small amount thereof within a hole provided in a small lead cylinder 14. The activity 13 is then covered and sealed with a layer of cement 16 to absorb any alpha emission therefrom. The primary radiations 18 from the source 13 impinging on the sample specimen 12 cause the characteristic secondary X-ray emissions 19 from the various elemental constituents of the sample.

A semiconductor diode 21 is biased from a voltage supply 20 and is positioned to receive a portion of the secondary X-ray emission from the sample 12. Detector 21 is a lithium-drifted diode of either silicon or germanium crystal, such diodes having 50% to 100% efficiency for the absorption of electromagnetic radiation and its conversion into electrical output pulses. Thus, the incident photons of secondary radiation are absorbed in the germanium or silicon detector and, principally by the photoelectric effect, produce output pulses therefrom which are directly proportional in energy to the absorbed X-ray.

The output 22 of detector 21 is coupled through an FET (field-effect transistor) input stage 23 of a low noise preamplifier 24. The FET 23 is located close to the detector 21 to eliminate stray capacitance and is cooled to liquid nitrogen temperature while that of the detector is held slightly thereabove, as will hereinafter be more fully discussed. Thus, the detector 21 and transistor 23 are disposed within an evacuated, low temperature-controlled housing, indicated schematically in FIGURE 1 by the broken-line boundary 26.

There have been various recent improvement in preamplifier circuitry to improve the signal-to-noise performance. A detailed description of a low noise preamplifier 24 circuit which could be used in the subject invention is published in Nuclear Instruments and Methods, volume 27 (1965), No. 2, December, pp. 327–329; North-Holland Publishing Co., Amsterdam.

Signals from the output 27 of preamplifier 24 are applied to a main amplifier 28 and then individually analyzed in a multi-channel pulse height analyzer 29 and stored in the memory storage 101, thereof. At the end of the data collection period, which is typically from a few seconds to a few minutes, the collected data is made available in paper tape form from a tape print-out unit 31 and/or plotted on an X-Y plotter 32 as a spectral graph of X-ray energy level versus intensity. For each sampling, the gain controls of the main amplifier 28 and of the pulse height analyzer 29 may be adjusted so that the X-rays of particular interest are suitably displayed on the output of the X-Y plotter 32.

Referring now to FIGURE 2, here is shown a structural embodiment of the detecting head 11 of FIGURE 1. A cylindrical aluminum container 33 provides a vacuum-tight housing for the detecting apparatus with provision for low temperature control. A thin beryllium window 34 forms one end of the housing 33 and has the small lead cylinder 14 containing the primary radiation source 13 cemented on the outside thereof. A suitable sample holder 35 is mounted at this end of housing 33 and holds the specimen 12 for analysis slightly forward of the radioactive source 13. Secondary radiations emitted by the specimen 12 are transmitted through the beryllium end window 34 toward the semiconductor diode detector 21 which is disposed therebehind, within the housing 33.

The crystal size of the lithium-drifted germanium or silicon detector 21 used in the invention is approximately 1–3 sq. cm. with the sensitive layer thereof averaging 2–10 mm. in depth. The diode 21 is disposed in the housing 33 with the sensing layer parallel to the plane of window 34 and is mounted on a thin circular aluminum plate 36.

The degree of energy resolution obtainable from the semiconductor detectors varies critically with the operating temperature, the detector capacitance, and the bias voltage. The optimum bias voltage range for semiconductors detectors is a function of the particular detector thickness and fabrication process. The optimum operating temperature for the subject detector 21 is in a range from $-163°$ C. to $-130°$ C. The signal-to-noise performance of the input stage 23 of preamplifier 24 is also enhanced by low temperature (liquid nitrogen) operation, as well as by the close coupling to the detector 21. Thus, the FET input stage 23 is directly coupled to the output 22 of detector 21 and is mounted therebehind at the end of a metallic stand-off rod 37.

The aluminum mounting plate 36 for detector 21 and the aluminum stand-off rod 37 for FET 23 act as cold surfaces and comprise part of the cooling system of the apparatus. A copper cold finger 38 is mounted in the opposite end of housing 33 from wind 34 and is connected to an external liquid nitrogen source 39. The end of metal stand-off rod 37 is mounted on and in thermal contact with cold finger 38 whereby the FET is held at the cold finger 38 by a pair of ceramic rods 41 which serve as liquid nitrogen temperature of $-196°$ C. The aluminum mounting plate 36 for detector 21 is supported from the heat leaks. An optimum higher temperature of $-130°$ C. for the detector 21 may thus be set by the length and diameter of the rods 41. A relatively large diameter bias voltage wire 42 serves to conduct heat into the detector to help achieve this temperature difference. The ceramic support rods 41 also allow the detector 21 coupling to be isolated from ground thereby further reducing stray capacitance in the system. The housing 33 is evacuated to an operating pressure of approximately $10^{-6}$ mm. Hg by a vacuum pump 43.

In the operation of the invention, the americium-241 radioactive source material 13 is used in combination with the silicon diode detector 21 and the cobalt-57 source is used with the germanium detector. The $^{241}$Am source material emits gamma and X-rays which can be absorbed by the innermost K or L shell electrons of any atom in the sample 12 whose electrons are lower in energy. This absorption results in the ejection of a K or L electron and subsequently in the emission of a K or L X-ray characteristic of the absorbing atom. The silicon detector 21 has a good absorption probability for the K X-radiation from the lighter elements while it tends to discriminate against K X-radiations of elements higher in the atomic scale. Thus the first combination of the $^{241}$Am source 13 and silicon detector 21 is most effective for the emission and detection of X-radiation from the K-electron shell of the lighter elements—from about calcium (atomic number 20) to berium (atomic number 68)—and for the study of L-shell radiations of the heavier elements. Due to certain limitations in the present state of the art, there is a detection sensitivity cut-off at very low energies whereby X-rays of the elements below calcium cannot be as clearly resolved.

The $^{57}$Co source 13 material emits gamma rays higher in energy than the binding energy of the K-electron of any chemical element so that K X-radiation of any element can be excited by them. The germanium is a more suitable detector for the higher energy K X-rays since photon absorption is directly related to atomic weight. Consequently, the second combination of the $^{57}$Co source 13 and germanium detector 21 is more effective for the excitation and analysis of the K-shell X-radiation of the heavier elements. Thus, by the proper choice of the source-detector combinations, the invention provides very good measuring efficiency and energy resolution over almost the entire range of energies of interest to X-ray emission spectroscopy.

As an example of the usefulness of the invention for the quick analysis of common materials, there is shown in FIGURE 3 the characteristic spectrum produced by X-Y plotter 32 from a solder specimen 12. For this material the $^{241}$Am radioactive source 13 and lithium-drifted silicon detector 21 combination of the apparatus was used for a testing time of two minutes. In the figure, the ordinate scale of pulse height relates to the radiation counts received per channel of the multi-channel pulse height analyzer 29 and is directly proportional to the intensity of the radiation. The abcissa scale relates to the separate channels of the analyzer 29 and is indicative of the characteristic energy level, or wavelength, of the radiation.

The peaks revealed in the spectral distribution produced by the plotter 32 represent the combined characteristic X-radiations of the constituent elements of the sample 12. The characteristic X-radiations and their relative intensity for all chemical elements are known and are published in tables. By reference to the tables, the analyst this identifies which elements could produce the particular combination of peaks. In the present example, the three X-radiation energy peaks "a", "b" and "c" at energy levels 10.55, 12.61, and 14.76 kev., respectively, are known to be the characteristic L X-radiations of lead. The two peaks "d" and "e" at the respective energies of 25.2 and 28.4 kev. are the known characteristic K X-radiations of tin—the composition of solder being 60% lead and 40% tin.

In addition to the high resolution, averaging from 1.1 to 1.5 kev. overall, of the subject spectrograph it can be seen that the operation of the device is extremely simple and rapid, with no destruction of the material under analysis. Furthermore, the compactness and economy of the apparatus provides for much wider usage than heretofore possible with conventional spectroscopes such as in mine and oil well test holes, chemical plant process streams, or other remote and confined locations.

Accordingly, while the invention has been described with respect to a particular embodiment thereof, it will be apparent to those skilled in the art that numerous modifications and variations are possible and thus it is not intended to limit the invention, except as defined in the following claims.

What is claimed is:
1. In apparatus for the detection and measurement of characteristic secondary X-radiation from a chemical sample, the combination comprising; a source of primary radiation essentially comprised of a field effect transistor disposed to excite said secondary X-radiation from said sample, a high resolution radiation detector disposed in the path of said secondary radiation, said detector being of the class producing an output signal proportional in charge amplitude to the energy of each incident photon of secondary radiation incident thereon, a charge-sensitive preamplifier, a low noise input stage essentially comprised of a field effect transistor in said preamplifier coupled to the output of said detector, a radiation shield disposed between said source and said detector, an amplifier coupled to the output of said preamplifier, pulse analyzing circuitry coupled to the output of said amplifier to determine the quantity of said charge signals from said detector at each energy level of said secondary X-radiation and temperature control means holding the temperature of said low noise input stage at approximately −196° C.

2. Apparatus as described in claim 1 wherein said detector is a semiconductor diode.

3. Apparatus as described in claim 2 further characterized by a temperature control means holding the temperature of said detector at approximately −130° C.

4. Apparatus as described in claim 1 wherein said detector is a lithium-drifted silicon crystal diode and said primary radiation source is a radioactive isotope emitting radiation of an energy greater than the electron binding energy of the lighter chemical elements of the atomic table.

5. Apparatus as described in claim 4 wherein said radioisotope is americium-241.

6. Apparatus as described in claim 1 wherein said detector is a lithium-drifted germanium crystal diode and said primary radiation source is a radioactive isotope emitting radiation of an energy greater than the electron binding energy of the heavier chemical elements of the atomic table.

7. Apparatus as described in claim 6 wherein said radioisotope is cobalt-57.

8. Apparatus for the compositional analysis of a chemical sample by means of characteristic X-ray emission therefrom, the combination comprising; a radioactive source disposed to direct primary gamma radiation onto said sample, a vacuum chamber having an X-ray radiation-transparent window provided therein, means cooling said chamber to a very low temperature, a semiconductor diode disposed in said vacuum chamber to receive secondary X-ray radiation emitted from said sample, a radiation shield disposed between said source and said diode, a bias voltage supply coupled to the anode of said semiconductor diode, a preamplifier, a field-effect-transistor input stage to said preamplifier disposed in said vacuum chamber and coupled to the cathode of said semiconductor diode in close proximity thereto to receive charge signals therefrom, an amplifier coupled to the output of said preamplifier, and a pulse height analyzer coupled to the output of said amplifier.

9. Apparatus as described in claim 8 wherein said cooling means comprises a liquid nitrogen source external to said vacuum chamber, a metallic rod having a solid end thereof extending into said vacuum chamber to provide a thermally-conductive mounting surface for said field-effect-transistor, an opposite hollow end of said rod being coupled to said external liquid nitrogen source, a metallic plate providing a thermally-conductive mounting surface for said diode detector, and ceramic support means attaching said metallic plate to said metallic rod to maintain said detector at a temperature higher than said transistor, as determined by the thermal conductivity of said ceramic support means.

10. Apparatus as described in claim 8 wherein said pulse height analyzer is of the type having a plurality of channels each being separately responsive to a separate energy level of said output signals from said semiconductor diode detector and further having a memory storage provided therein to accumulate said diode output signals at each of said energy levels thereof, said apparatus further comprising means recording the accumulated outputs of said pulse height analyzer.

11. Apparatus as described in claim 10 wherein said recording means is a graphic plotter responding to the accumulated output of said pulse height analyzer to produce a spectrum of the intensity versus characteristic energy level of said secondary X-radiation.

References Cited

UNITED STATES PATENTS

| | | | |
|---|---|---|---|
| 3,102,952 | 9/1963 | Hendee et al. | 250—51.5 |
| 3,225,198 | 12/1965 | Mayer | 250—83.3 |
| 2,920,205 | 1/1960 | Choyke | 250—83.3 |

RALPH G. NILSON, *Primary Examiner.*